United States Patent Office 2,813,055
Patented Nov. 12, 1957

2,813,055

IMPROVED PROCESS FOR BONDING MATERIAL BY MEANS OF COMPOSITIONS COMPRISING ETHYLENICALLY UNSATURATED POLYESTERS AND POLYMERIZABLE OLEFINIC MONOMERS

Günther Nischk, Leverkusen-Wiesdorf, and Erwin Müller and Otto Bayer, Leverkusen-Bayerwerk, Germany, assignors to Farbenfabriken Bayer Aktiengesellschaft, Leverkusen, Germany, a corporation of Germany No Drawing. Application July 7, 1953,
Serial No. 371,176

Claims priority, application Germany July 11, 1952

6 Claims. (Cl. 154—140)

The present invention relates to a new and improved process of bonding materials, especially metals.

In our copending application Ser. No. 338,908, filed February 25, 1953, we have described a process of bonding materials of all kinds, especially metals including light metals, by causing a mixture of a polymerization product containing carboxyl groups obtained by chemical addition of anhydrides of unsaturated carboxylic acids and polyesters having hydroxyl end groups with at least one unsaturated vinyl compound, to copolymerize at the connecting seam by means of peroxide or other catalytic substances.

In the further development of the above described inventive idea we have found that the bonding strength of the above products is considerably enhanced, if at least one of the components of the copolymerizable mixture contains at least one ether group in the molecule. The ether group may be present in the polycarboxylic acid or in the polyalcohol of the ester, or also in the vinyl compound.

Polyesters containing ether groups, which are suitable according to the invention, can be obtained for instance by thermal esterification of polyalcohols containing ether groups with polycarboxylic acids. The polyalcohols containing ether groups, which are required in this esterification reaction, are produced in known manner by reaction of ethylene oxide upon polyalcohols. Of course, also polycarboxylic acids containing ether groups may be reacted with polyalcohols or polyalcohols containing ether groups in the production of condensation products containing ether groups, which consist substantially of ester groups.

Suitable polymerizable olefinic monomeric compounds are for instance styrene, vinyl acetate and methacrylates, which may be employed in combination with the ether groups containing unsaturated condensation or polymerization products consisting substantially of ester groups. Also olefinic monomeric compounds containing ether groups are useful in the new process, for instance the acrylate of glycol monomethyl ether or the diacrylate of diethylene glycol.

These olefinic monomeric compounds containing ether groups may be copolymerized at the connecting seam with the unsaturated polymerization or condensation products obtained by chemical addition of anhydrides of unsaturated carboxylic acids and the polyesters having hydroxyl end groups, which may contain or may not contain ether groups. Vice versa, said polymerization or condensation products containing ether groups may be reacted with vinyl compounds which contain no ether groups. Examples of polyalcohols which may be used as starting components in the production of polyesters containing ether groups are diethylene glycol, dibutylene glycol ether or polyethylene glycols, furthermore reaction products of ethylene oxide and trimethylol propane, hexanetriol and pentaerythritol, which, of course, may also be employed in mixture with polyalcohols which contain no ether groups. As polycarboxylic acids containing ether groups there may be mentioned diglycolic acid and butanediol ether dicarboxylic acid which may be employed according to the invention besides dicarboxylic acids devoid of aliphatic unsaturation, such as succinic acid, adipic acid and phthalic acid and aliphatically unsaturated dicarboxylic acids such as maleic acid.

The polymeric products containing ether groups and carboxyl groups may be produced for instance by esterifying the polyalcohols with the dicarboxylic acids whereupon a polyester containing hydroxyl groups is obtained if the polyalcohols are used in excess quantities, and reacting the hydroxyl groups of this polyester in a second step with unsaturated carboxylic anhydrides such as maleic anhydride. This reaction results in polyesters containing carboxyl groups, the amount of carboxyl groups being equivalent to that of hydroxyl groups.

The herein described unsaturated polymeric products containing carboxyl groups are mixed with vinyl compounds and caused to copolymerize at the connecting seam by means of peroxides and minor quantities of salts of heavy metals, which are soluble in organic solvents, for instance cobalt chloride, cobalt naphthenate, manganese nahpthenate and cobalt maleinate. It is also within the scope of the invention to employ polymerization products as a component of the polymerizable mixture containing a tertiary or secondary nitrogen atom, which may be obtained by condensing the components of the ester in the presence of a tertiary or secondary amine.

The new process shows the following advantages over the process described in our copending application Ser. No. 338,908, filed filed February 25, 1953: the above-said polyglycols containing ether groups impart to the condensation products containing carboxyl groups, which are prepared therefrom, a substantially increased solubility in monomeric vinyl compounds as compared with condensation products containing the polyalcohol as such. A specific advantage is the considerably greater bonding strength at higher tensile temperatures.

The invention is illustrated by the following examples without being restricted thereto, the parts being by weight.

EXAMPLE 1

100 parts of a branched polyester prepared from 56 parts of phthalic anhydride, 55 parts of adipic acid and 190 parts of a hydroxyethylated trimethyl propane of the hydroxyl number 790 and showing the hydroxyl number 248 and the acid number 2.1, are heated to 120° C. and reacted with 44 parts of maleic anhydride. After heating to this temperature for one hour the addition reaction is complete. 0.2 part of hydroquinone and 61 parts of styrene are then added to the solution which is well stirred.

After cooling 1 percent of benzoyl peroxide and 0.05 percent of cobalt chloride, dissolved in a smaller quantity of methanol, are added and the solution is applied in a thin layer to the roughened surfaces. The surfaces to be bonded are then superposed with slight pressure and heated to 100° C. for one hour.

The tensile strength for aluminum averages 235 kg./cm.$^2$ at a tensile temperature of 20° C. and 130 kg./cm.$^2$ at a tensile temperature of 100° C.

EXAMPLE 2

100 parts of a branched polyester prepared from 74 parts of phthalic anhydride, 37 parts of adipic acid and 190 parts of a hydroxy ethylated trimethylol propane of the hydroxyl number 790 and having the hydroxyl number 230 and the acid number 1.5, are heated to 120° C. and mixed with 37 parts of maleic anhydride and kept at 120° C. for one hour. 0.2 part of hydroquinone and 60 parts of styrene are then added to the solution which is well stirred and allowed to cool. The bonding process is carried out as described in Example 1.

The tensile strength for aluminum averages 240 kg./cm.² at 20° C. and 150 kg./cm.² at 100° C.

EXAMPLE 3

100 parts of a branched polyester, prepared from 111 parts of phthalic anhydride and 190 parts of hydroxy ethylated trimethylol propane of the hydroxyl number 790 by thermal esterification shows the hydroxyl number 235 and the acid number 2.5, are heated to 120° C., 40 parts of maleic anhydride are added and the solution is kept at 120° C. for one hour. 0.2 part of hydroquinone and 60 parts of styrene are then added to the solution which is well stirred.

The bonding process is carried out as described in Example 1. The tensile strength for aluminum is as follows:

*Tensile strength at 20° C.*

|  | kg./cm.² | overlapping | calculated on 1 cm.² |
|---|---|---|---|
| (1) | 260 | 1.1 | 236 |
| (2) | 257 | 1.05 | 244 |
| (3) | 237 | 1.05 | 226 |
| (4) | 235 | 1.05 | 224 |
| (5) | 226 | 1.0 | 226 |

*Tensile strength at 100° C.*

|  | kg./cm.² | overlapping | calculated on 1 cm.² |
|---|---|---|---|
| (1) | 204 | 1.1 | 186 |
| (2) | 201 | 1.05 | 193 |
| (3) | 192 | 1.06 | 181 |
| (4) | 215 | 1.06 | 203 |
| (5) | 210 | 1.16 | 181 |

EXAMPLE 4

A branched polyester having the acid number 1.8 and the hydroxyl number 230 is prepared by thermal esterification of 365 parts of adipic acid, 74 parts of phthalic anhydride, 700 parts of hydroxy ethylated trimethylol propane and 5 parts of p-(N-diphenyl)-diethanolamine. After cooling to 125° C. 100 parts of this polyester are reacted with 35 parts of maleic anhydride and well stirred at 125° C. for 1 hour. After the addition reaction is complete 0.1 part of hydroquinone is added, the solution is cooled to 100° C. and 59 parts of styrene are introduced.

After addition of 1% of benzoyl peroxide the slightly roughened metal surfaces, coated with a thin layer, are superposed under pressure and heated to 50° C. for 20 minutes.

We claim:

1. A process of bonding materials which comprises copolymerizing at the bonding surfaces, a mixture of a polymerization product containing carboxyl groups obtained by chemical addition of (1) an anhydride of an ethylenically unsaturated aliphatic carboxylic acid and (2) a polyester having hydroxyl end groups and being devoid of aliphatic carbon to carbon unsaturation, said polyester being derived from a polyhydric alcohol and a polycarboxylic acid, with at least one polymerizable monomeric olefinic compound, in which process at least one of the components (1) and (2) contains at least one ether oxygen.

2. A process of bonding materials which comprises copolymerizing at the bonding surfaces, in the presence of a peroxide, a mixture of a polymerization product containing carboxyl groups obtained by chemical addition of (1) an anhydride of an ethylenically unsaturated aliphatic carboxylic acid and (2) a polyester having hydroxyl end groups and being devoid of aliphatic carbon to carbon unsaturation, said polyester being derived from a polyhydric alcohol and a polycarboxylic acid with at least one polymerizable monomeric olefinic compound, in which process at least one of the components (1) and (2) contains at least one ether oxygen.

3. A process of bonding materials which comprises copolymerizing at the bonding surfaces, in the presence of a peroxide and an organic-solvent-soluble salt of the group consisting of cobalt and manganese salts, a mixture of a polymerization product containing carboxyl groups obtained by chemical addition of (1) an anhydride of an ethylenically unsaturated aliphatic carboxylic acid and (2) a polyester having hydroxyl end groups and being devoid of aliphatic carbon to carbon unsaturation, said polyester being derived from a polyhydric alcohol and a polycarboxylic acid, with at least one polymerizable monomeric olefinic compound, in which process at least one of the components (1) and (2) contains at least one ether oxygen.

4. A process of bonding materials which comprises copolymerizing at the bonding surfaces, a mixture of a polymerization product containing carboxyl groups obtained by chemical addition of (1) an anhydride of an ethylenically unsaturated aliphatic carboxylic acid and (2) a polyester having hydroxyl end groups and being devoid of aliphatic carbon to carbon unsaturation, said polyester being derived from a polyhydric alcohol and a polycarboxylic acid and amines having not more than one hydrogen atom attached to the amino nitrogen, with at least one polymerizable monomeric olefinic compound, in which process at least one of the components (1) and (2) contains at least one ether oxygen.

5. A process of bonding materials which comprises copolymerizing at the bonding surfaces, in the presence of a peroxide, a mixture of a polymerization product containing carboxyl groups obtained by chemical addition of (1) an anhydride of an ethylenically unsaturated aliphatic carboxylic acid and (2) a polyester having hydroxyl end groups and being devoid of aliphatic carbon to carbon unsaturation, said polyester being derived from a polyhydric alcohol and a polycarboxylic acid and amines having not more than one hydrogen atom attached to the amino nitrogen, with at least one polymerizable monomeric olefinic compound, in which process at least one of the components (1) and (2) contains at least one ether oxygen.

6. A process of bonding materials which comprises copolymerizing at the bonding surfaces, in the presence of a peroxide and an organic-solvent-soluble salt of the group consisting of cobalt and manganese salts, a mixture of a polymerization product containing carboxyl groups obtained by chemical addition of (1) an anhydride of an ethylenically unsaturated aliphatic carboxylic acid and (2) a polyester having hydroxyl end groups and being devoid of aliphatic carbon to carbon unsaturation, said polyester being derived from a polyhydric alcohol and a polycarboxylic acid and amines having not more than one hydrogen attached to the amino nitrogen, with at least one polymerizable monomeric olefinic compound, in which process at least one of the components (1) and (2) contains at least one ether oxygen.

References Cited in the file of this patent

UNITED STATES PATENTS

| 2,318,959 | Muskat et al. | May 11, 1943 |
| 2,336,985 | Freund | Dec. 14, 1943 |
| 2,443,741 | Kropa | June 22, 1948 |
| 2,480,928 | Hurdis | Sept. 6, 1949 |

FOREIGN PATENTS

| 540,169 | Great Britain | Oct. 8, 1941 |